Inventor:
HORST BACHMANN

ATTORNEYS

Inventor:
HORST BACHMANN
ATTORNEYS

Dec. 30, 1969   H. BACHMANN   3,487,196
DIE FOR ELECTRICAL UPSETTING
Filed Feb. 9, 1967   3 Sheets-Sheet 3
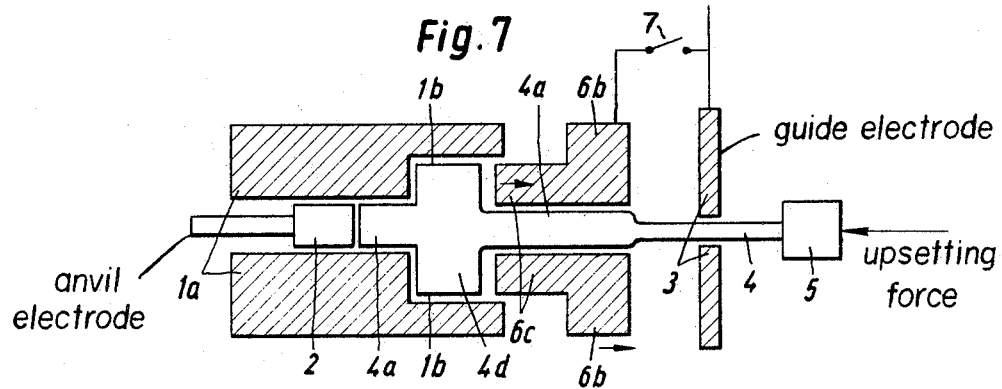
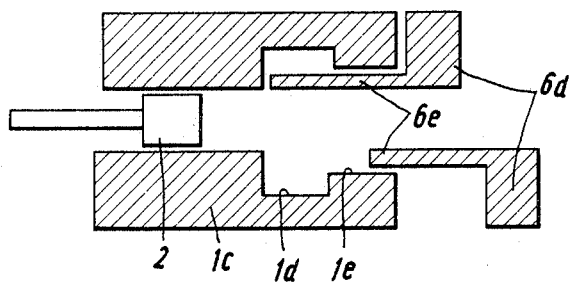
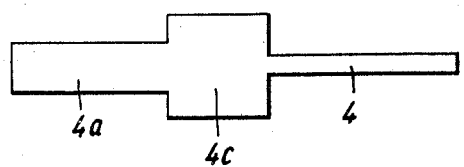
Inventor:
HORST BACHMANN
Owen, Wickersham & Erickson
ATTORNEYS United States Patent Office 3,487,196
Patented Dec. 30, 1969

3,487,196
DIE FOR ELECTRICAL UPSETTING
Horst Bachmann, Haan, Rhineland, Germany, assignor to Maschinenfabrik Hasenclever Aktiengesellschaft, Dusseldorf, Germany, a corporation of Germany
Filed Feb. 9, 1967, Ser. No. 615,011
Claims priority, application Germany, Feb. 10, 1966, M 68,355
Int. Cl. H05b 1/00; B21j 5/08
U.S. Cl. 219—151
4 Claims

ABSTRACT OF THE DISCLOSURE

An apparatus and method for electrically upsetting rod-like blanks into workpieces with a plurality of adjoining segments having different diameters is provided by a combination of two dies, one having a cavity with an internal movable electrical anvil and the other die adjacent thereto having a cavity of a different diameter and separable in sections to facilitate removal of the workpiece.

---

The invention relates to a method and an apparatus for upsetting rod-like metal blanks to form workpieces having integral segments of different diameters. More particularly, it relates to a die for such apparatus with a cavity in which a movable abutment is provided for withstanding the required upsetting force.

Electrical upsetting makes it possible to produce in a single operation a large number of workpieces with a precision that cannot be achieved with other methods. The use of electrical resistance heating of the metal blank during the process produces a workpiece almost entirely free of scale. This enables its volume to be accurately measured and, also avoids the abrasive effect of such waste materials during subsequent stamping in the die. A further advantage of electrical upsetting is that the workpiece need not be reheated after upsetting, since stamping is carried out in the same heat.

During electrical upsetting a rod-like metal blank is held by clamping jaws of the guide electrode, and a force is exerted on the free trailing end of the rod-like blank to urge it firmly against an anvil electrode, which is provided with a wearing plate. When the heating current is turned on, power flows through the portion of the rod-like blank or workpiece between the two electrodes, and this portion is thus heated to the forging temperature while being upset by the force exerted on the trailing end of the blank. As the upsetting progresses, the cold material moves up between the electrodes, and the upsetting process develops continuously. By gradually enlarging the clearance between the anvil electrode and the guide electrode, room is made for the growing upset head, without attaining the limit where the heated blank would buckle. Thus, electrical upsetting sets no limits to the length of upset.

If workpieces are upset in a die having an anvil electrode which is retracted into the die while the material of the advancing metal blank fills the space thus formed, upsets of any desired length may be obtained, but the upset part will have the same diameter over its entire length.

One object of the present invention is to provide an improved electrical upsetting apparatus similar in some ways to that described above but which will produce, in a single operation, workpieces having segments of different diameters.

A more specific object of my invention is to provide an apparatus which will produce a unitary workpiece having a first upset segment of a predetermined diameter integral with a second segment of a predetermined larger or smaller diameter, as desired. This object is accomplished in accordance with the invention by a second die which is provided in series with a first die, the diameter of the second die cavity being different from the diameter of the first die cavity, and the diameter of the second die cavity being larger than the diameter of the rod-like metal blank.

In the case where the diameter of the second die cavity is smaller than that of the first die cavity, the second die preferably comprises two or more parts which are movable into or out of the range of the metal blank. These second die parts may thus be moved to the side after upsetting has been completed, to facilitate withdrawal of the workpiece, whose segment of larger diameter rests inside the first die. However, upsetting may be started with only the first die, which produces the larger diameter by moving the guide electrode closely to its aperture. This avoids buckling or undesired deformation of the metal blank which is heated between the electrodes before reaching the die. If, after the first segment of larger diameter has been produced on the workpiece, the guide electrode is withdrawn from the first die aperture until the second die is mounted in series with the first die, and the anvil electrode is not moved any further while the upsetting pressure is maintained, the cavity of the second die will become filled with the blank material pushed through the guide electrode, and a second upset segment of smaller diameter is formed. After completion of the deformation process, the second die is removed and the workpiece may be pulled out of the first die.

The construction of the second die may simply comprise two halves which are divided along a plane passing through the longitudinal center axis of the metal blank. These parts of the second die are preferably movable radially in relation to the blank to facilitate its removal.

Still another object of my invention is to provide an electrical upsetting apparatus capable of producing workpieces with three integral segments of different diameters. This object is accomplished with a modified embodiment of the present invention wherein the first die has at least two adjoining segments of different cavity diameters, the cavity with the larger diameter being located at the end from which the blank is introduced. In combination therewith the second die has projecting portions which engage the first die and reduce the size of the larger-diameter cavity to substantially that of the smaller-diameter cavity. These projecting portions may be moved back from the engaging position, and with such a die, workpieces with three integral segments of different diameters may be produced if the projecting portions on the second die, when in position of engagement, leave open a diameter at least equal to the smaller diameter cavity in the first die.

In accordance with a further embodiment of the invention, the first die may have additional segments of enlarged diameter in the area covered over by the projections of the second die when in position of engagement, the first die consisting of parts which may be separated in radial direction. With this apparatus, workpieces of even more complicated shapes may be electrically upset.

Another object of my invention is to provide a method for operating dies of the above described type. I have found that, if workpieces are upset under uniform pressure, the frequently desired sharp transitions from one segment to the next offset segment are not obtained. A surprising result of the present invention is that such sharp transitions are obtained by subjecting the workpiece, at suitable moments, to pressure impulses or electrical current surges (increased energy supply), or both, simultaneously.

Other objects, advantages and features of the invention will become apparent from the description presented hereinbelow in greater detail in connection with the drawings.

In the drawings:

FIG. 7 is a similar view showing the embodiment of FIG. 6 after a further operational phase has been completed;

FIG. 8 is a schematic composite view in elevation of another embodiment of the invention in which the two most important operational positions have been represented in the upper and lower half of the drawing, respectively; and FIG. 9 is a view in elevation of a workpiece with sharp transitions produced in accordance with the method of the present invention.

Figure 1:
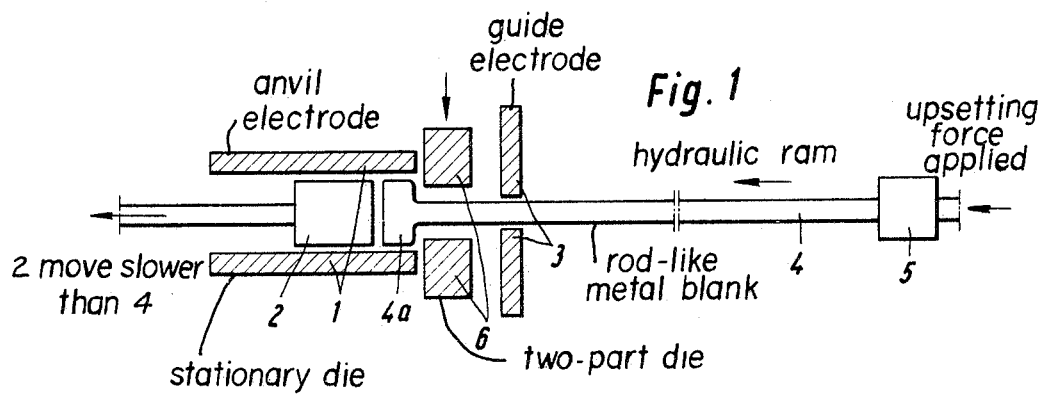
FIG. 1 is a schematic view in side elevation representing an embodiment of an apparatus embodying the principles of my invention, with the elements shown at the beginning of the upsetting process.

Referring to FIG. 1, numeral 1 designates a stationary die which supports an anvil electrode 2 that moves longitudinally in the die 1. A rod-like metal blank 4 is pushed into the die 1 through the clamp jaws of a guide electrode 3, for example, by a hydraulically actuated ram 5. The segment of the blank between the guide electrode 3 and the anvil electrode 2 is electrically heated so that, under the influence of the thrust exerted by the ram 5 on the one hand, and of the opposing force generated by the anvil electrode which acts as an abutment, on the other hand, a head 4a is formed which fills the space cleared in the die 1 by the retreat of the anvil electrode 2. A second die 6 is arranged in series with the inlet aperture of the die 1, the die 6 being comprised of two halves which may be separated.

Figure 2:
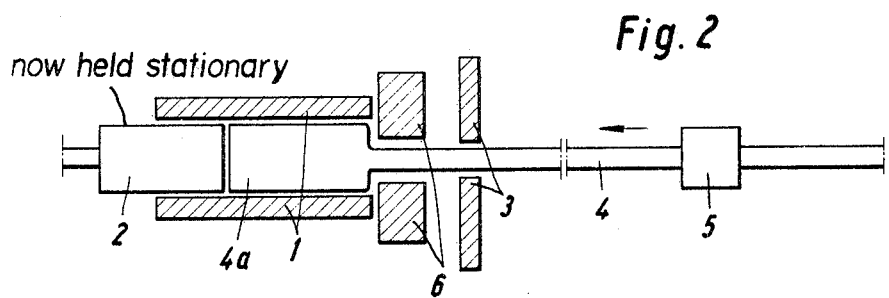
FIG. 2 is a similar schematic view of the embodiment of FIG. 1, after the first segment has been upset.

In accordance with FIG. 2, the anvil electrode 2 is retracted until the head 4a reaches the desired length. The withdrawing movement of the anvil electrode 2 is slower than the forward movement of the ram 5, so that sufficient blank 4 material is available at all times for filling the constantly increasing space at the input end of the die.

Figure 3:
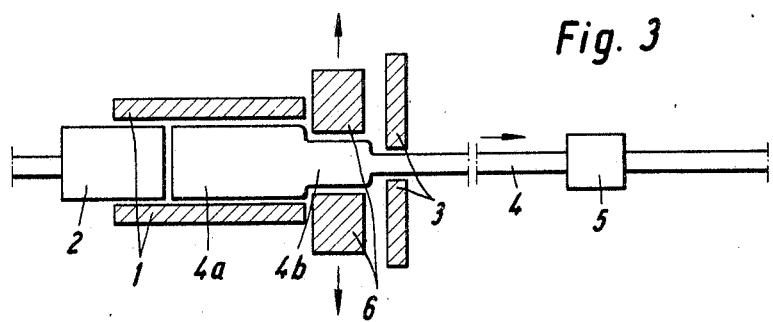
FIG. 3 is a similar schematic view of the embodiment of FIGS. 1 and 2, after the upsetting process has been terminated.

After the head 4a has reached the desired length, the anvil electrode 2 is secured in position, as in FIG. 2. As the blank 4 is pushed further by the ram 5, the free cross-sectional area still available in the die 6 is filled to provide a second, thinner, segment 4b. FIG. 3 shows the workpiece after upsetting, but still in the die 1, 6. In order to remove from the die the workpiece having the thicker segment 4a and the thinner segment 4b, which adjoin the original blank 4, the two halves of the second die 6 are moved apart in a radial direction, as shown by arrows in FIG. 3, and the workpiece is retracted from the dies. After the anvil electrode 2 has been returned into its starting position and the second die 6 has been brought into the position illustrated in FIGS 1–3, the apparatus is ready for the next upsetting process.

If there is any danger of undesired lateral deformation of the electrically heated thinner portion between the guide electrode 3 and the segment 4a, which is the first to be upset, the second die 6 may be removed during the first operational phase so that the guide electrodes 3 can be placed closer to the input end of the die 1. After completion of the first phase, during which a head 4a of required length has been produced, the guide electrodes 3 are retracted from the input end of the die 1 until the parts of the movable divisible die 6 can be moved from the sides into the position shown in FIG. 2.

Figure 4:
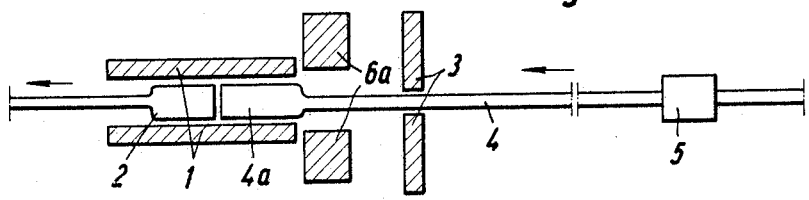
FIG. 4 is a similar schematic view in elevation of another embodiment of the invention, with the elements shown after the first segment of the workpiece has been upset.
Figure 5:
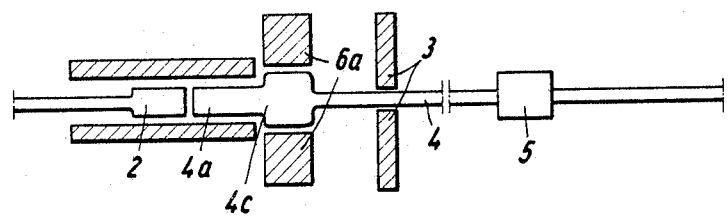
FIG. 5 is a similar schematic view of the embodiment of FIG. 4, after the second segment of larger diameter has been upset.

The apparatus of FIGS. 4 and 5 produces a workpiece by electrical upset, in which a segment 4c of thicker diameter follows a segment 4a of thinner diameter. Here also, a head 4a is first formed by introducing the metal blank 4 with the aid of the ram 5, the withdrawal of the anvil electrode 2 again being slower than the advance of the ram 5, so as to generate the required counterthrust or upsetting force. When the segment 4a has reached the desired length, the anvil electrode 2 is secured in place while the ram 5 continues to advance. The advancing material of the blank 4 now fills the free cross-sectional area still available in the second die 6a. As soon as this process has been terminated, the workpiece is ready. The workpiece produced in accordance with the proposal of FIGS. 4 and 5 may be withdrawn after the guide electrode 3 has been released. The procedure in this instance may be the same as set forth above, namely, with the guide electrode 3 at first located closely before the input end of the die 1, with the second die 6a removed, in order to avoid lateral buckling of the blank which has already been heated over this portion. The second die 6a is then brought before the input end of the die 1, when the workpiece has assumed the shape shown in FIG. 4 and the guide electrode 3 has been withdrawn from the die 1 in the same manner.

Figure 6:
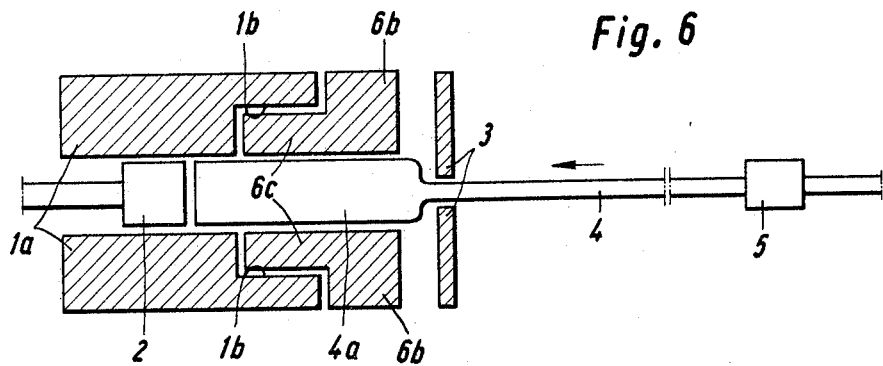
FIG. 6 is a similar schematic view of yet another embodiment of the present invention, showing the elements after the first phase of the upsetting process.

Another embodiment of the invention which enables the production of a workpiece consisting of three upset segments is illustrated in FIGS. 6 and 7. Here, the cross-sectional area of the stationary die 1a is enlarged at 1b, while forming an offset toward the input end. A second movable two-part die 6b is disposed in series with the die 1a and has axially directed projections 6c which engage in that part 1b of the die 1a which is of enlarged cross-sectional area, leaving a free unobstructed cross-sectional area which corresponds to the narrower part of the die 1a.

During the upsetting process (FIG. 6), a head 4a is at first formed, a part of its length resting in the narrower segment of the die 1, and another part inside the second die 6b.

Then, as shown in FIG. 7, the die 6b is partially moved out of the die 1b against the direction of upset, so that the material of the blank 4 urged forward by the ram 5 fills the cavity formed in the part 1b of the die 1a. During this operation, the anvil electrode 2 is secured in place. In order to impart the required plasticity to the material filling the cavity in the part 1b, the current is supplied through the die 6b during the second step of the upsetting process. This can be accomplished either by using a switch 7 to divert the current supply from the guide electrode 3 to the die 6b, or by shortcircuiting the electrode 3 with the die 6b. When the workpiece has acquired the desired shape, the die 6b is withdrawn completely from the die 1a, and the two halves of the second die 6b are removed from the workpiece by moving them in a radial outward direction, so that the workpiece can now be taken out of the die 1a. In order to prevent lateral buckling of the section of the metal blank which, according to FIG. 6, lies between the guide electrode 3 and the upset part 4a, the guide electrode 3 may be (mechanically) insulatedly connected by a suitable linkage means with the parts of the die 6b so that it follows their movements and remains at all times in close proximity thereof.

With the die illustrated in FIG. 8, workpieces of even more complicated cross-sectional shape may be produced. For this purpose, a first die 1c is provided having at least two parts which are separable in radial direction.

As shown in FIG. 8, the die 1c consists of a segment disposed forward in the direction of upset and whose diameter corresponds to that of the anvil electrode 2. Joined thereto, against the direction of upset, is a segment 1d of enlarged diameter which in turn is integrally connected at an abrupt shoulder with a segment 1e of smaller internal diameter than the segment 1d, but larger than the remaining part of the die 1c.

On the input side of the die, a second die 6d is provided which, when in starting position, reaches with an extension 6e into the first die 1c to a depth equaling the joint length of the segments 1d and 1e. In the position of the die 6d illustrated in the upper half of FIG. 8, the upsetting force at first produces a head 4a corresponding to that of FIG. 6. When the die 6d is retracted into the position shown in the lower part of FIG. 8, the material pushed forward by the ram 5 fills the additional space opened up in the segments 1d and 1e. During this second operational phase, heating current for the workpiece is preferably supplied by the die 6d.

The ready workpiece has four segments which are offset in relation to each other, the leading and the trailing segments having the same diameter, while the two middle segments have larger diameters. In order to take the workpiece out of the die 1c, the latter is, as already mentioned, divided longitudinally into at least two halves which are movable away from each other by suitable means in a radial direction In many instances, it is desirable to produce sharp transistions between the segments 4a, 4c, and 4 of different diameters (see FIG. 9) which have been formed according to the method of FIG. 5. I have discovered that this can be accomplished by exerting pressure impulses axially on the workpiece at suitable moments with the aid of the ram 5. The material forced forward by the ram 5 is thereby made to completely fill the interior of the die, so that the inner shape of the die is accurately transmitted to the workpiece.

I have found that the production of sharp transitions in the workpiece is also enhanced by temporarily increasing the intensity of the current supplied to the workpiece during the upsetting process. Due to the resulting increased plasticity, the material fills the interior of the die up into its corners, and the inner shape of the die is accurately transmitted to the workpiece. Both methods, namely, pressure impulses and current surges, may be employed simultaneously.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:
1. An apparatus for electrically upsetting rod-like metal blanks to form workpieces having segments of different diameters comprising:
   a first die having a cavity,
   means in said first die forming a movable abutment for engaging the end of a metal blank and resisting the axial force applied for upsetting it,
   said first die having at least two segments, one with a smaller cavity containing said movable abutment and another having an adjoining cavity with a larger diameter, said larger diameter cavity being disposed at the end from which a blank is introduced,
   a second die arranged in series with said first die and having a cavity of a different size than the cavity of said first die and through which a rod-like metal blank can extend to engage said movable abutment means,
   said second die being comprised of two or more parts which are movable to various positions either smaller or larger than that of the blank, and
   projections on said second die extending within said first die and thereby reducing a portion of its larger diameter cavity to a diameter substantially equal to the diameter of the smaller cavity of said first die, said second die being retractable from its original position of engagement within said first die.

2. The apparatus as described in claim 1 wherein said first die has additional segments each with a cavity having an inside diameter greater than its smaller cavity and located therein so as to be covered by the said projections of the said second die when in position of engagement, said first die being comprised of parts which are separable in a radial direction.

3. An apparatus for electrically upsetting rod-like metal blanks to form workpieces having segments of different diameters comprising:
   a first die having a cavity,
   means in said first die forming a movable abutment for engaging the end of a metal blank and resisting the axial force applied for upsetting it,
   said first die having at least two segments, one with a smaller cavity containing said movable abutment and another having an adjoining cavity with a larger diameter, said larger diameter cavity being disposed at the end from which a blank is introduced,
   a second die arranged in series with said first die and having a cavity of a different size than the cavity of said first die and through which a rod-like metal blank can extend to engage said movable abutment means, said second die being comprised of at least two parts which are movable to various positions either smaller or larger than that of the blank,
   projections on said second die extending within said first die and thereby reducing a portion of its larger diameter cavity to a diameter substantially equal to the diameter of the smaller cavity of said first die, said second die being retractable from its original position of engagement within said first die,
   means for projecting a said metal blank into said first die against said abutment under pressure to provide the axial force for upsetting said blank,
   pressure means supporting said abutment for yielding by movement in the same direction as said blank is moving at a slower constant rate of speed, and
   stationary stop means for preventing further movement of said abutment after a desired amount of movement has been completed.

4. The apparatus as described in claim 3 wherein said first die has additional segments each with a cavity having an inside diameter greater than its smaller cavity and located therein so as to be covered by the said projections of the said second die when in position of engagement, said first die being comprised of parts which are separable in a radial direction.

References Cited

UNITED STATES PATENTS

| 1,849,185 | 3/1932 | Giacchino | 219—151 |
|-----------|--------|-----------|---------|
| 2,581,774 | 1/1952 | Stone et al. | 219—152 |
| 2,667,558 | 1/1954 | Aeckersberg et al. | 219—152 |

JOSEPH V. TRUHE, Primary Examiner

B. A. STEIN, Assistant Examiner

U.S. Cl. X.R.

72—354; 219—152